(12) United States Patent
Nagashima et al.

(10) Patent No.: US 6,431,644 B1
(45) Date of Patent: Aug. 13, 2002

(54) SLIDING ROOF DEVICE

(75) Inventors: Youji Nagashima, Toyota; Kenji Maeta, Kariya; Hiroshi Makino, Nagoya; Takashi Kitani, Kariya, all of (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/697,436

(22) Filed: Oct. 27, 2000

(30) Foreign Application Priority Data

Oct. 29, 1999 (JP) .......................... 11-310225
Nov. 16, 1999 (JP) .......................... 11-325590

(51) Int. Cl.⁷ .............................................. B60J 7/057
(52) U.S. Cl. .................................. 296/223; 296/216.08
(58) Field of Search ................... 296/216.06–216.08, 296/223

(56) References Cited

U.S. PATENT DOCUMENTS

| | | | | |
|---|---|---|---|---|
| 4,749,227 A | * | 6/1988 | Bienert et al. | 296/223 X |
| 5,104,178 A | | 4/1992 | Bienert | 296/213 X |
| 5,527,086 A | * | 6/1996 | Mori et al. | 296/223 |
| 5,612,600 A | * | 3/1997 | Bratkowski et al. | 296/223 X |

FOREIGN PATENT DOCUMENTS

| | | | |
|---|---|---|---|
| DE | 2912666 | * 10/1979 | 296/223 |
| DE | 33 15 075 | 11/1983 | |
| DE | 40 14 487 | 5/1990 | |
| DE | 692 11 780 | 3/1992 | |
| DE | 43 01 635 | 1/1994 | |
| DE | 43 13 687 | 11/1994 | |
| DE | 696 04 428 | 1/1996 | |
| EP | 0 520 523 | 6/1996 | |
| EP | 0 723 887 | 9/1999 | |
| JP | 6-106985 | 4/1994 | |
| JP | 6-219158 | 8/1994 | |

* cited by examiner

Primary Examiner—Dennis H. Pedder
(74) Attorney, Agent, or Firm—Finnegan, Henderson, Farabow, Garrett & Dunner LLP (57) ABSTRACT

A sliding roof device is made up of a pair of laterally spaced guide rails provided at inner peripheries of an open area formed in a vehicular roof panel, the guide rails supporting a movable panel in movable fashion in order to open and close the open area; a front frame connecting a front end of one of the guide rails and a front end of the other, the front frame and the pair of the guide rails constituting a sunroof frame; and a driving mechanism including a motor, a gear mechanism driven by the motor, an output gear associated with the gear mechanism, a geared cable engaged with the output gear in meshing fashion and connected to the movable panel for the movement thereof when the motor is turned on, and a casing pipe through which the geared cable is passed in movable fashion, characterized in that a housing and a box are provided, the housing placing the output gear outside the sunroof frame, the housing accommodating therein the gear mechanism, the box being formed integrally with the sunroof frame, the box covering the meshing engagement between the geared cable and the output gear.

3 Claims, 7 Drawing Sheets

SLIDING ROOF DEVICE

BACKGROUND OF THE INVENTION

1. Field of the Invention

The present invention is directed to a vehicular sliding roof or sunroof device.

2. Prior Art

In general, typical conventional or prior art sliding roof devices are made up of (a) a pair of laterally spaced guide rails provided at inner peripheries of an open area formed in a vehicular roof panel, the guide rails supporting a movable panel in movable fashion in order to open and closes the open area;

(b) a front frame connecting a front end of one of the guide rails and a front end of the other, the front frame and the pair of the guide rails constituting a sunroof frame; and (c) a driving mechanism including a motor, a gear mechanism driven by the motor, an output gear associated with the gear mechanism, a geared cable engaged with the output gear in meshing fashion and connected to the movable panel for the movement thereof when the motor is turned on, and a casing pipe through which the geared cable is passed in movable fashion.

For example, in Japanese Unexamined Patent Publication (So-called 'KOKAI KOHOH') No.Hei.6-106985 published in Apr. 19, 1994 ($6^{th}$ year of Heisei) which discloses one of the conventional or prior art sliding roof devices which has the aforementioned structure, the geared cable is in meshing engagement with the output gear in a box which is placed outside the frame. The box is formed of a metal due to the fact the box has to have a sufficient mechanical strength, which results in that the sliding roof device becomes heavy in weight. Also, the box is in the form of a separation member relative to the frame, which leads to an increase of the number of parts of the sliding roof device. Moreover, in the foregoing structure, after connecting the casing pipe to the box, the resulting box is secured to the frame, with the results that such a securing is very cumbersome.

In addition, the casing pipe is secured to the guide rail. In detail, a joint which is in the form of iron plate is connected to the distal end of the casing pipe by brazing and the resulting joint is connected to the guide rail by screw while the casing pipe is inserted into the guide rail. However, the aforementioned securing of the casing pipe to the guide rail has the following drawbacks: The brazing cost becomes high. The inevitable high temperature in brazing may deform the casing pipe. Using the joint as a separate element increases the number of parts and making the assembly operation more cumbersome. The screw connection between the joint and guide rail has to be done without interference of the joint with the guide rail, which requires very precious brazing. In summary, connecting the casing pipe to the guide rail becomes complex in construction, high in cost, and cumbersome in assembly.

Thus, a need exists to provide, for overcoming the aforementioned drawbacks, a sliding roof device

SUMMARY OF THE INVENTION

The present invention has been developed to satisfy the request noted above and a first aspect of the present invention provides a sliding roof device which comprises:

a pair of laterally spaced guide rails provided at inner peripheries of an open area formed in a vehicular roof panel, the guide rails supporting a movable panel in movable fashion in order to open and close the open area;

a front frame connecting a front end of one of the guide rails and a front end of the other, the front frame and the pair of the guide rails constituting a sunroof frame; and a driving mechanism including a motor, a gear mechanism driven by the motor, an output gear associated with the gear mechanism, a geared cable engaged with the output gear in meshing fashion and connected to the movable panel for the movement thereof when the motor is turned on, and a casing pipe through which the geared cable is passed in movable fashion, characterized in that a housing and a box are provided, the housing placing the output gear outside the sunroof frame, the housing accommodating therein the gear mechanism, the box being formed integrally with the sunroof frame, the box covering the meshing engagement between the geared cable and the output gear.

In accordance with the first aspect of the present invention, the box is formed integrally with the sunroof frame i.e. the sunroof frame has, as its own portion, the box, which makes it possible to connect or mount the driving mechanism to the sunroof frame when the housing is fixed to the box for covering the meshing engagement between the geared cable and the output gear. Thus, in comparison with the conventional or prior art sliding roof device, the number of parts can be decreased in addition to the decreasing of the steps for assembly.

In addition, due to the fact that the box is formed of resin, the weight of the box is lighter than a metal-made box such as iron-made box and the shape of the box can be formed in desired state for reinforcing the portion which covers the meshing engagement between the geared cable and the output gear. Thus, the box comes to be in a preferable mode.

At an inner surface of the box a supporting member is preferred to be provided to ensure the meshing engagement between the geared cable and the output gear. Such a structure restricts the damages of the cable and the box which result from the sliding engagement between the geared cable and the inside surface of the box when the geared cable is pulled and pushed in the box. Such a structure makes it possible to restrict the outward displacement of the geared cable from the engagement between the geared cable and the output gear.

More preferably, a holding hole is desired to be provided at a side wall of the box for holding a casing pipe which extends into the box from an outside thereof and through which the geared cable passes in movable fashion. Such a structure makes it possible to mount the casing pipe to the box at the same time when the box is fixed with the housing.

A second aspect of the present invention is to provide a sliding roof device which comprises:

a pair of laterally spaced guide rail provided at inner peripheries of an open area formed in a vehicular roof panel, the guide rails supporting a movable panel in movable fashion in order to open and close the open area;

a front frame connecting a front end of one of the guide rails and a front end of the other, the front frame and the pair of the guide rails constituting a sunroof frame; and a driving mechanism including a motor, a gear mechanism driven by the motor, an output gear associated with the gear mechanism, a geared cable engaged with the output gear in meshing fashion and connected to the movable panel for the movement thereof when the motor is turned on, and a casing pipe through which the geared cable is passed in movable fashion, characterized in that one of the guide rails has a groove which extends in its lengthwise direction, the groove being fitted with one end of the casing pipe and receiving the geared cable for its guidance, one end of the casing pipe has an insertion portion which is inserted in the groove and a flange portion which is set to be larger than the insertion portion in radius for restricting a length of the insertion of the insertion portion into the groove, the front frame is provided with a supporting portion which is placed at opposite side of the insertion portion and which supports the casing pipe along a direction of the insertion of the casing pipe into the groove.

In accordance with the second aspect of the present invention, for mounting the casing pipe to the guide rail, first of all, the front frame is connected to the lengthwise end of the guide rail, in the vertical direction, after supporting the casing pipe at the A supporting portion of the front frame. At this time, the supporting portion supports the potion of the casing pipe which is opposite to the insertion portion with respect to the flange portion. Next, under the condition that the casing pipe is supported at the supporting portion, the insertion portion of the casing pipe is inserted or fitted in the groove along its lengthwise direction. Due to the fact that the flange portion is set to be larger than the insertion portion of the casing pipe, engaging the flange portion with the end of the groove restricts the insertion length of the casing pipe. Under the resulting condition, connecting the guide rail to the front frame makes it a regulation of the displacement of the casing pipe along the lengthwise direction of the groove after insertion of the casing pipe into the groove. Consequently, no conventional joint is required for connecting the casing pipe to the guide rail, which brings in that brazing operation becomes unnecessary for the. connection of the joint to the casing pipe, with the result that the connecting structure between the casing pipe and the guide rail becomes much simpler and the related cost can be restricted or reduced.

Preferably, the sliding roof device is desired to have a structure wherein the supporting portion of the front frame has a concave portion corresponding to an outer profile of an opposite portion of the insertion portion of the casing pipe so as to be engagement therewith when the sunroof frame is connected to the guide rail. Such a structure makes it possible to restrict a displacement of the casing pipe toward the front frame, resulting in a preferred condition.

Preferably, the sliding roof device is desired to have a structure wherein the front frame makes a =right angle relative to the guide rail such that a corer portion is defined therebetween, the casing pipe extends along the front frame including the corner portion, the casing pipe is supported at an extension extending from the corner portion. Such a structure makes it possible to restrict a displacement of the casing pipe away from the front frame, which results in a preferable condition.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DETAILED DESCRIPTION OF THE PRESENT INVENTION

Figure 1:
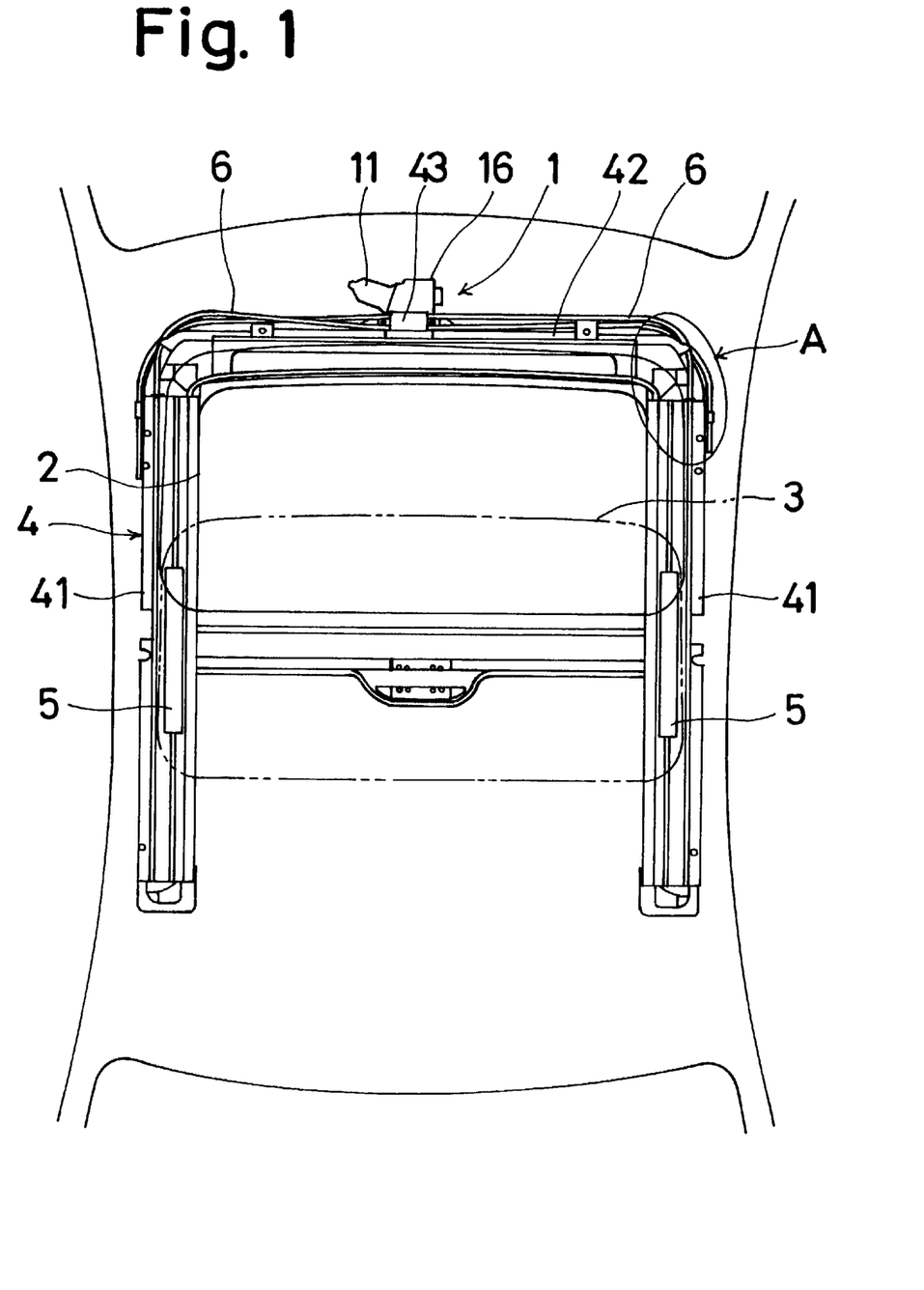
FIG. 1 illustrates a top view of a sliding roof device in accordance with the present invention.

First of all, with reference to FIG. 1, which illustrates a top view of a sun roof or sliding roof, which employs a driving device or mechanism 1, a vehicular roof panel is formed therein with an open portion or area 2. A pair of guide rails 41 and 41 extend in a vehicular longitudinal direction in FIG. 1 along a pair of opposed inner peripheries of the open portion 2, respectively and are secured thereto. A movable or slide panel 3 is supported by the guide rails 41 and 41 so as to be movable or slidable in the vehicular longitudinal direction. At a front periphery of the open portion 2, there is provided a resin-made front frame 42 to which a front end of each of the guide rails 41 and 41 is connected in the vertical direction. The pair of the guide rails 41 and 41 and the front frame 42 constitute a sunroof frame 4.

At the front frame 42 positioned at the front periphery of the open area 2, the driving mechanism 1 drives the slide panel 3 to open and close the open area 2 in such a manner that when an output gear 13 is rotated, which is in association with a gear mechanism 14, which is driven by an electric motor 11 as driving source, a geared cable 12 in meshing engagement with the gear mechanism is moved. The driving device 1 is operatively connected to each link mechanism 5 by way of the geared cable 12. A distal end of the geared cable 12 is secured in the guide rail 41 after being passed through or guided in a casing pipe 6 as is well known.

Figure 2:
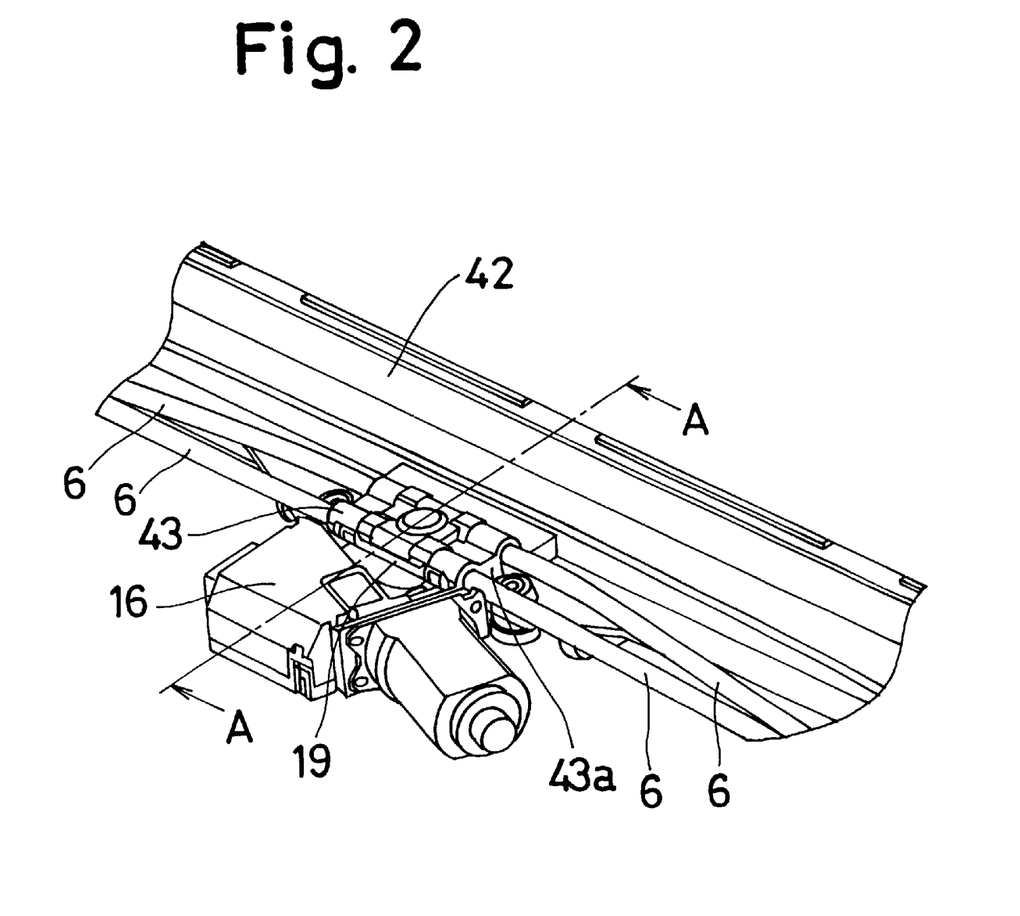
FIG. 2 illustrates a perspective view of a front portion of the sliding roof device shown in FIG. 1.
Figure 3:
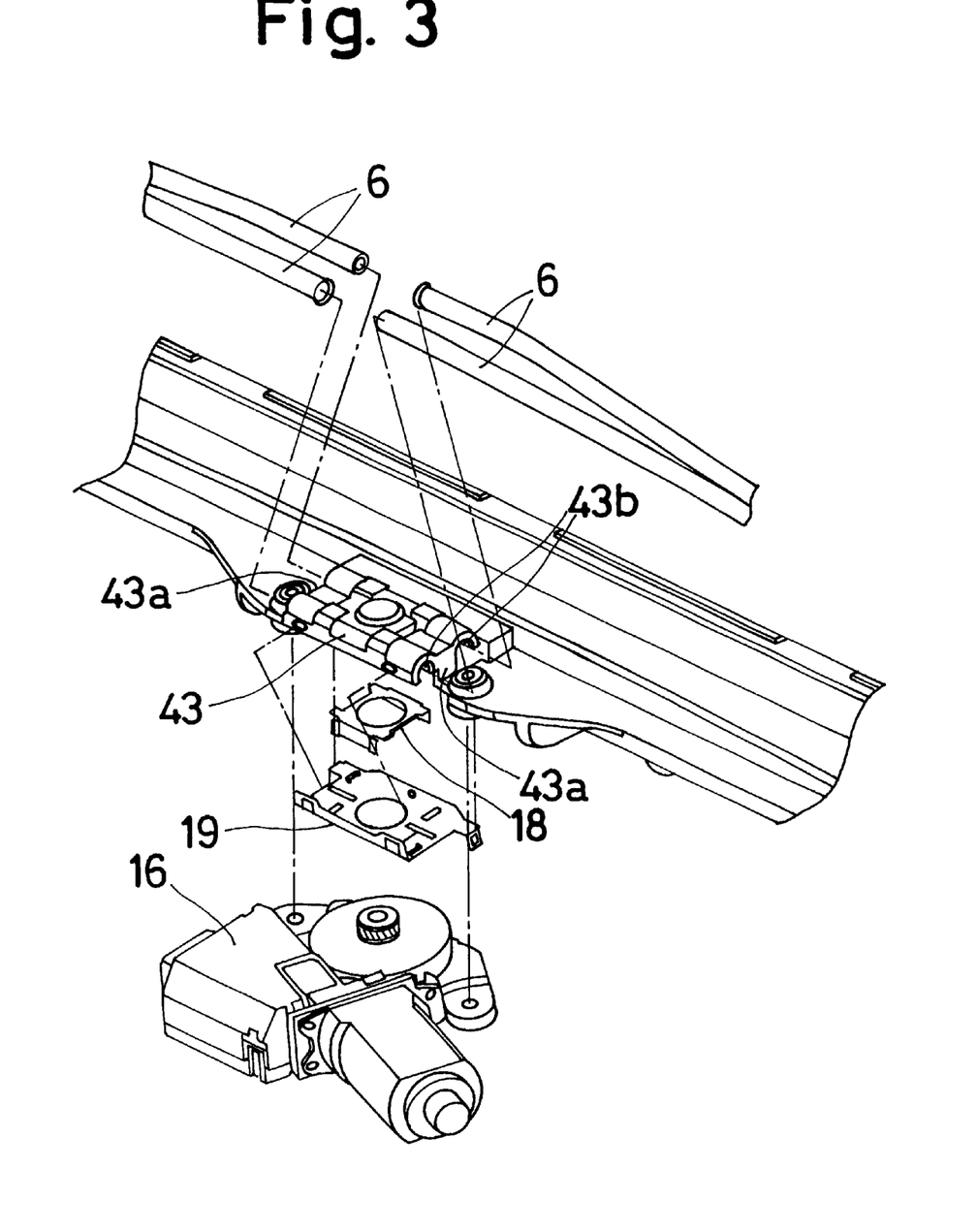
FIG. 3 illustrates an exploded perspective of the structure shown in FIG. 2.
Figure 4:
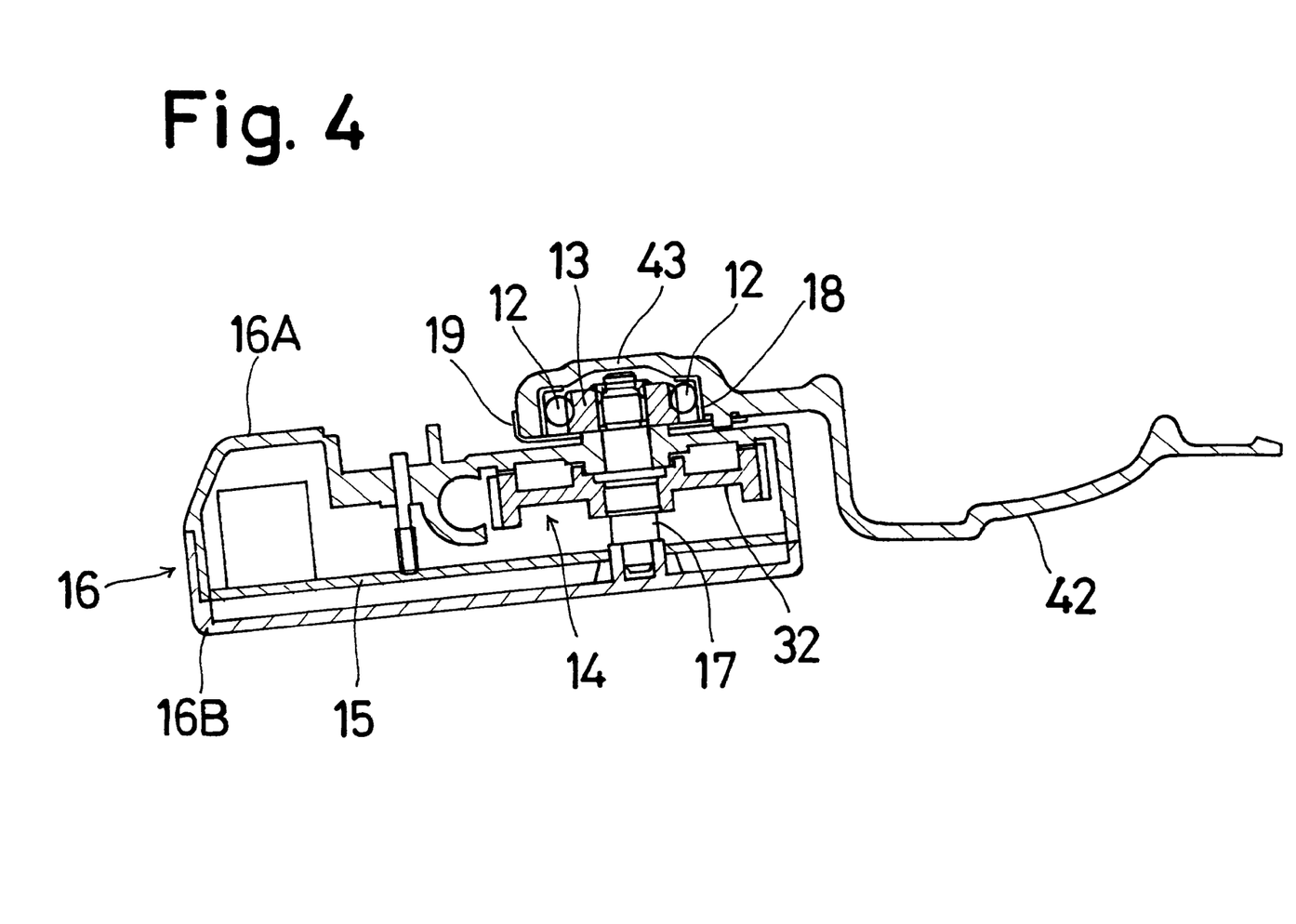
FIG. 4 illustrates a cross-sectional view taken along line A—A in FIG. 2.

As can be seen from FIGS. 2 to 4 inclusive, the driving device 1 is made up , mainly, of the motor 11, the gear mechanism 14 driven by the motor 11, the output gear 13 which is in meshing engagement with the geared cable 12 which is in association with the movable panel 3, a circuit substrate 15 on which are mounted electrical elements for controlling the motor 11, and a housing 16 in which the gear mechanism 14 end the circuit substrate 15 are accommodated.

The housing 16 is made up of an upper case 16A and a lower case 16B. The upper case 16A is in the form of a bottom opened box-shaped structure and is placed at a side of the gear mechanism 14, while the lower case 16B is connected to the of the upper case 16A to define a closed space in the housing 16. The connection between the upper case 16A and the lower case 16B is made or established by a male-and-female connection (not shown). An output shaft 17 of the gear mechanism 14 is rotatably supported by the cases 16A and 16B in such a manner that the output shaft 17 passes through the circuit substrate 15 and traverses the accommodating space in the housing 16. One end of the output shaft 17 extends outside the upper case 16A after passing therethrough, and is fixed with the output gear 13 for unitary rotation.

A shaft of the motor 11 is secured with a worm gear (not shown) [which is] in meshing engagement with a worm wheel gear 32. The worm wheel gear 32 is fixedly mounted on the output shaft 17 of the gear mechanism 14 so as to be rotated together with the output shaft 17. The worm gear and the worm wheel gear 32 constitute the gear mechanism 14. When the motor 11 is turned on, the resultant rotation is transmitted, after speed reduction at the gear mechanism 14, to the output shaft 17, thereby rotating the output shaft 17. The resultant rotation of the output shaft 17 is derived or outputted from the output gear 13. Thus, depending on the direction of the rotation of the output shaft 17, the movable panel 3 is made to slide or tilt down for closing the open area 2 or is made to slide or tilt up for opening the open area 2.

The output gear 13 positioned outside the housing 16 is in meshing engagement with the geared cable 12 and another geared cable 12 in such a manner that the geared cables 12 and 12 are moved in opposite directions when the output gear 13 is brought into rotation. A box 43, and a supporting member 18 disposed inside the box 43, cover or conceal the member 18 disposed inside the box 43, and cover or conceal the output gear 13 and the geared cables 12 and 12, particularly the meshing portion between the output gear 13 and each of the geared cables 12. The supporting member 18 is in the form of an iron-made leaf spring. Employing the supporting member 18 for supporting the geared cable 12 maintains the meshing engagement between the geared cable 12 and the output gear 13, making possible damage of the output gear 13 and the geared cable 12 as small as possible when the geared cable 12 is pulled and pushed, and restricts a radially outward movement of the geared cable 12 away from the output gear 13.

The box 43 is formed integrally with the reinforced-nylon-made front frame concurrently when the front frame 42 is formed by injection molding in such a manner that the box 43 is placed at a central portion of the front frame 42 and is extended in the frontward direction. When injection molding, the surface at which the geared cable 12 is supported is made to be thicker than the upper surface for restricting the aforementioned radially outward movement of the geared cable 12 away from the output gear 13. At each side wall 43a of the box 43, a pair of spaced holding holes 43b and 43b are formed and thus the number of the holding holes 43b becomes four. A pair of the holding holes 43b, which are axially in line with each other, hold the casing pipe 6 through which the corresponding geared cable 12 is passed for the guidance thereof, while another pair of the holding holes 43b, which are axially in line with each other hold the casing pipe 6 through which the corresponding other geared cable 12 is passed for the guidance thereof. Each of the geared cables 12, 12 is connected to the corresponding link mechanism 5. When the box 43 is fitted with a lid 19 from the bottom, under the condition that the casing pipes 6 are held in the respective holding holes 43b and the supporting members 18 are provided inside the box 43, mounting or providing the casing pipes 6 and the supporting members 18 inside the box 43 is completed. It is to be noted that one of the casing pipes 6, through which the geared cable 12 used for sliding the movable panel 3 passes, is of a larger radius than than the radius of the corresponding holding holes 43b in order that the casing pipe 6 is snugly fitted in the holding holes 43b, thereby preventing the casing pipe 6 from movement in the holding holes 43b when the geared cable 12 moves.

The mounting of the aforementioned driving device 1 is as follows: Fitting the lid 19 into the bottom of the box 43 is made under the condition that the supporting members 18 are disposed inside the box 43 and the four casing pipes 6 are fitted into the respective holding holes 43b, which results in that the casing pipes 6 and the supporting members 18 are mounted in the box 43. It is to be noted at this time the geared cables 12 are still out of the respective casing pipes 6. Next, the geared cable 12 is inserted into the corresponding casing pipe 6 from its end which is at the side of the corresponding link mechanism 5. And, a screw connection is made between the box 43 and the housing 16 in order that within the box 43 each of the geared cable 12 is brought into meshing engagement with the output gear 13 which is placed outside the housing 16 in which the motor 11, the gear mechanism 14, and the circuit substrate 15 are accommodated. Thus, the driving device 1 is made to be connected to the front frame 42. It is to be noted that the resultant front frame 42 or the front frame 42 on which the driving device 1 is mounted is connected to the guide rails 41 to constitute the sunroof frame 4.

As described above, the integration of the front frame 42 and the box 43 which covers the meshing engagement portion between each of the geared cable 12 and the output gear 13 makes it possible to connect the driving device 1 to the front frame 42 by the screw connection of the box 43 and the housing 16. Thus, when compared to the conventional sliding roof device, the sliding roof device becomes smaller in the number of parts, becomes much simpler in construction, and becomes easier in assembly. In addition, the box 43 is made by injection molding, which makes it possible to make a portion of the box 43 thicker which is to be reinforced, resulting in preference in mass and assembly.

It is to be noted the foregoing disclosure is not restrictive and therefore any other structures become possible such as a modification of the driving device 1 to provide a damper mechanism between the output gear and the output shaft or a modification of the housing to include a detection device to detect the current position of the movable panel.

Figure 5:
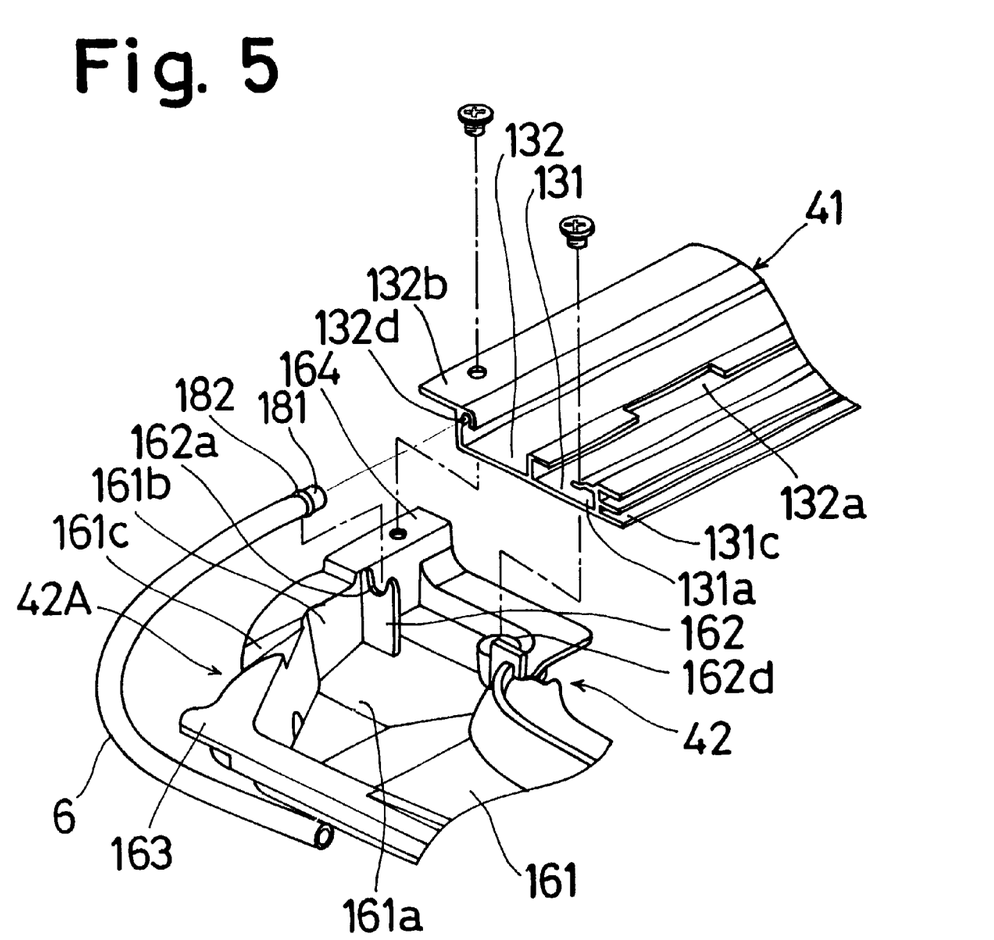
FIG. 5 illustrates a perspective exploded view of a portion encircled with 'A' in FIG. 1.
Figure 6:
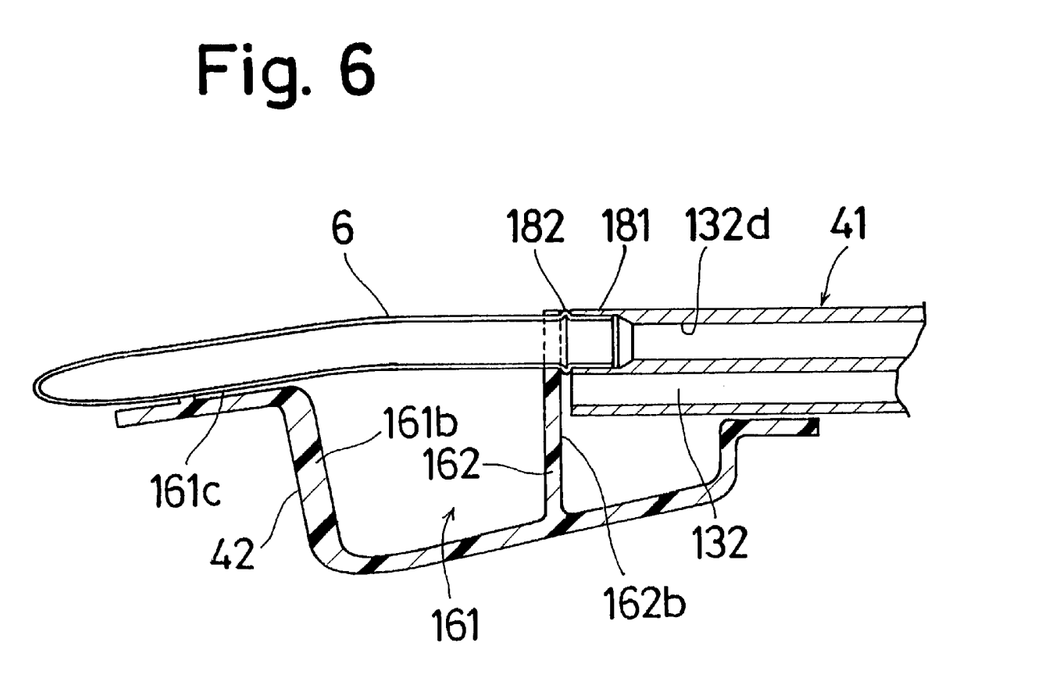
FIG. 6 illustrates a perspective view of the portion encircled with 'A' in FIG. 1.
Figure 7:
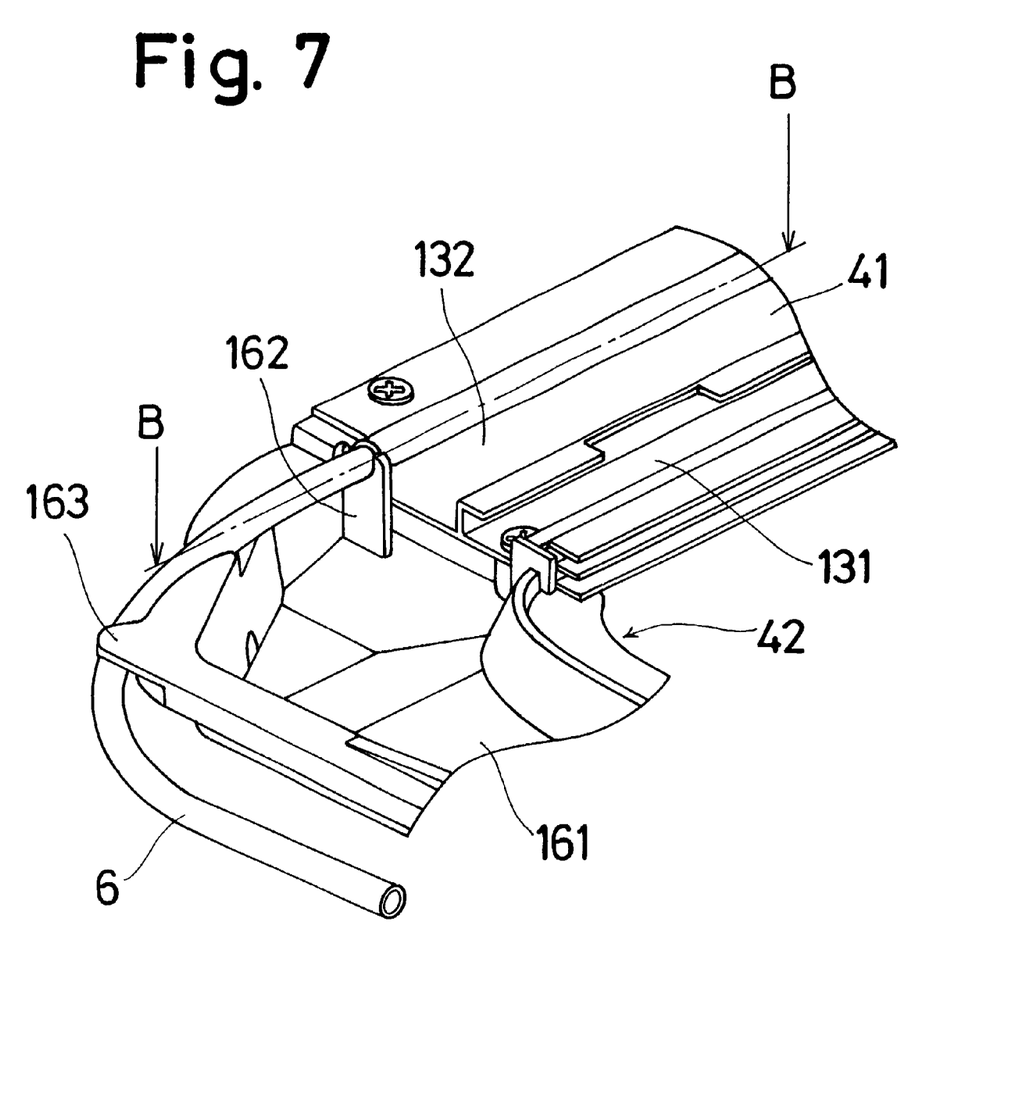
FIG. 7 illustrates a cross-sectional view taken along line B—B in FIG. 6.

Referring now to FIGS. 5 to 7 inclusive, the guide rail 41 is formed into an integration structure of a guide portion 131 and a first gutter portion 132 which extends in the lengthwise direction. The guide portion 131 supports the movable panel 3 in slidable fashion. The first gutter portion 132 is placed below a border portion between the roof panel and the movable panel 3 when the open area is fully closed by the movable panel. That is to say, the first gutter portion 132 is placed below the inner periphery of the open area 2. The guide portion 131 is provided at its opposite walls with grooves 131a, each of which serves for sliding the corresponding link mechanism 5. The guide portion 131 is formed at its inner wall with a groove 131c, which serves as a sunshade panel (not shown). The first gutter portion 132 is of a substantially U-shaped cross-section and its side wall 132a is formed with a flange portion 132b and a groove 132d which is secured with the distal end of the casing pipe 6 for receiving the geared cable 12 extending therefrom. The guide portion 131 and the first gutter portion 132 are combined with each other such that one side wall of the guide portion 131 is connected to the other wall of the first gutter portion 132 so that the guide portion 131 becomes placed inner than the first gutter portion 132. The guide rail 41 having this structure is made by aluminum extrusion as previously mentioned.

The end portion of the casing pipe 6 is made up of an insert portion 181 to be inserted into the groove 132d and a flange portion 182 which defines or regulates the axial length or inserting length of the insert portion 181. The flange portion 182 is formed integrally with the insert portion 181 and is larger than the insert portion 181 in radius. The casing pipe 6 is formed or iron. It is to be noted that the forming of the flange portion 182 is made by bulging wherein the casing pipe 6 is buckled outwardly in radial direction.

The front frame 42 is placed below the border portion between the roof panel and the movable panel 3 (i.e. below the inner periphery of the open area 2) when the open area 2 is fully closed by the movable panel 3. The front frame 42 has an integral second gutter portion 161. The second gutter portion 161 has also an integral supporting portion 162 which extends from both of bottom 161a and a side wall 161b. At a top side of the supporting portion 162, there is formed a concave portion 162a for receiving the outer profile of the casing pipe 6 when the front frame 42 is secured to the guide rail 41. It is to be noted that the position of the supporting portion 162 is designed such that, when the guide rail 41 is secured to the front frame 42, the axial thickness of the flange portion 182 is in made to be in coincidence with an axial gap between the side wall 162b and the end of the groove 132d. At a corner 42A of the front frame 42, an integral extension 163 extends from the upper side of the side wall 161b in the outward direction. Moreover, between the extension 163 and the supporting portion 162, there is formed a guide groove 161c which is larger than the casing pipe 6 in width. The thus structured front frame 42 is made of reinforced nylon through molding as previously mentioned.

The mounting of the casing pipe 6 to the guide rail 41 is as follows: Due to the fact that the casing pipe 6 is connected to the driving device 1, concurrently with the mounting of the driving device 1 on the front frame 42, the casing pipe 6 is connected to the front frame 42. At this time, the portion of the casing pipe 6, which is at the opposite side of the insert portion 181, is held at the concave portion 162a of the supporting portion 162, which extends in the upward direction from the bottom 161a of the second gutter portion 161. In addition, at the corner 42A of the front frame 42, the casing pipe 6 is bent into a curvature along with that of the cornering angle of the corner 42A. Then the casing pipe 6 passes below the extension 163 so as not to shift in the upward direction and is connected to the driving device 1. After such a mounting of the casing pipe 6 to the front frame 42, the casing pipe 6 and the front frame 42 are connected to the guide rail 41. Due to the fact that the casing pipe 6 has been mounted to the front frame 42, concurrently with the insertion of the insert portion 181 of the casing pipe 6 into the groove 132d of the guide rail 41, the end of the front frame 42 and the end of the guide rail 41 are brought into an overlapped connection to establish a fluid communication between the first gutter portion 132 and the second gutter portion 161. The length of the insert portion 181 of the casing pipe 6 inserted in the groove 132d is regulated by the engagement of the flange portion 182 of the casing pipe 6 with the end of the groove 132d. At this time, the opposite side of the casing pipe 6 is supported or held by the supporting portion 162. Thus, the casing pipe 6 can be prevented from being removed from the guide rail 41 when the geared cable 12 moves in the casing pipe 6 in sliding mode. Under the resulting condition, when the flange portion 132b of the first gutter portion 132 and the guide portion 131 are brought into tapping screw connections with the flange portion 164 of the front frame 42 and the mounting portion 162d of the second gutter portion 161, respectively, the guide rail 41 is connected to both of the front frame 42 and the casing pipe 6 concurrently.

As apparent from the aforementioned descriptions, connecting the casing pipe 6 and the guide rail 41 can be made without additional member such as the joint used in the conventional connection, which results in that brazing becomes unnecessary, thereby simplifying the connecting structure between the casing pipe 6 and the guide rail 41. Thus, the production cost can be reduced, which is a preferable merit.

It is to be noted the aforementioned disclosure of connecting the casing pipe 6 and the guide rail 41 is not respective. Thus, the driving device 1 can be positioned anywhere other than the front side of the vehicle or the gutter portion can be in separation from the guide rail or the sunroof frame.

In summary, in accordance with the present first invention, the box is formed integrally with the sunroof frame i.e. the sunroof frame has , as its own portion, the box, which makes it possible to connect the driving device to the sunroof frame by fixing the housing to the box. Thus, when compared with the conventional device, the number of parts of the driving device becomes smaller., which results in decreasing the steps in assembly of the driving device.

In accordance with the present second invention, the connection of the casing pipe to the guide rail can be made without the joint which is an essential for the conventional connection, which results in that brazing operation becomes unnecessary for the connection of the joint to the casing piper with the result that the connecting structure related to the casing pipe and the guide rail becomes much simpler and the related cost can be restricted.

The invention has thus been shown and description with reference to specific embodiments, however, it should be understood that the invention is in no way limited to the details of the illustrates structures but changes and modifications may be made without departing from the scope of the appended claims.

What is claimed is:

1. A sliding roof device comprising:
   a pair of laterally spaced guide rails provided at inner peripheries of an open area formed in a vehicular roof panel, the guide rails supporting a movable panel in order to open and close the open area;
   a front frame connecting the front ends of the guide rails to each other, the front frame and the pair of the guide rails defining a sunroof frame; and
   a driving mechanism including a motor, a gear mechanism driven by the motor, an output gear associated with the gear mechanism, a pair of geared cables engaged with the output gear and connected to the movable panel for the movement thereof when the motor is turned on, and a pair of casing pipes through which the geared cables are passed,
   wherein one of the guide rails has a groove that extends in its lengthwise direction, the groove being fitted with one end of a respective casing pipe and receiving the geared cable, said one end of the respective casing pipe having an insertion portion inserted in the groove and a flange portion displaced out of the groove and having a larger diameter than diameters of the insertion portion and the groove, the front frame being provided with supporting portions that support the casing pipe thereon along a direction of the insertion of the casing pipe into the groove at an opposite portion of the insertion portion relative to the flange portion and upwardly in relation thereto, when the front frame is secured to the guide rail.

2. A sliding roof device as set forth in claim 1, wherein the supporting portion of the front frame has a concave portion corresponding to an outer profile of an opposite portion of the insertion portion of the casing pipe relative to the flange portion so as to be engagement therewith when the front frame is connected to the guide rail.

3. A sliding roof device as set forth in claim 1, wherein the front frame makes a right angle relative to the guide rail such that a corner portion is defined therebetween, the casing pipe extending along the front frame including the corner portion, the casing pipe being supported at an extension extending from the corner portion.

* * * * *